United States Patent

Ockels

[11] Patent Number: 6,072,245
[45] Date of Patent: Jun. 6, 2000

[54] WIND-DRIVEN DRIVING APPARATUS EMPLOYING KITES

[76] Inventor: Wubbo Johannes Ockels, Boekenroodeweg 45, 2111 HK Aerdenhout, Netherlands

[21] Appl. No.: 08/969,002

[22] Filed: Nov. 12, 1997

[30] Foreign Application Priority Data

Nov. 12, 1996 [NL] Netherlands ............................ 1004508

[51] Int. Cl.⁷ ...................................................... F03D 5/00
[52] U.S. Cl. .............................................. 290/55; 290/44
[58] Field of Search .................................. 290/43, 44, 54, 290/55; 415/2.1; 244/30, 153 R, 153 A

[56] References Cited

U.S. PATENT DOCUMENTS

| | | | |
|---|---|---|---|
| 3,987,987 | 10/1976 | Payne et al. | 244/153 R |
| 4,124,182 | 11/1978 | Loeb | 244/153 R |
| 4,165,468 | 8/1979 | Fry et al. | 290/55 |
| 4,166,596 | 9/1979 | Mouton, Jr. et al. | 244/30 |
| 4,486,669 | 12/1984 | Pugh | 290/44 |
| 4,659,940 | 4/1987 | Shepard | 290/55 |
| 4,966,569 | 10/1990 | Assano | 446/440 |
| 5,056,447 | 10/1991 | Labrador | 114/39.1 |

FOREIGN PATENT DOCUMENTS

| | | |
|---|---|---|
| 2 475 148 | 8/1981 | France . |
| 24 37 003 | 2/1976 | Germany . |
| 2 119 451 | 11/1983 | United Kingdom . |
| 2 201 469 | 9/1988 | United Kingdom . |
| 2 206 652 | 1/1989 | United Kingdom . |

*Primary Examiner*—Nicholas Ponomarenko
*Attorney, Agent, or Firm*—Varnum, Riddering, Schmidt & Howlett LLP

[57] ABSTRACT

A driving apparatus for driving a drive shaft, which includes a number of kites and at least one pulling cable, and means for varying the position of the kites, the kites being arranged to follow an ascending path and a descending path, the kites being connected to the at least one pulling cable, which pulling cable engages a driving element which is connected to the drive shaft, and the means for varying the position of the kites are arranged to impose a first position on the kites in the ascending path in which they are subject to an upward force under the influence of the wind, and a second position in the descending path in which the kites, under the influence of the wind, are subject to a lesser upward force than in the ascending path or even are subject to a downward force.

20 Claims, 12 Drawing Sheets

FOLDABLE KITE

WIND-DRIVEN DRIVING APPARATUS EMPLOYING KITES

This invention relates to a completely new type of driving apparatus which extracts its energy from the wind.

The known apparatuses generally comprise a number of blades connected by a first end thereof to a drive shaft and extending in radial direction from this drive shaft. A drawback of such windmills is that they can produce only a limited power, as the blades cannot be made of very great length. The energy yield of a mill with blades is limited in particular by the maximum tip speed, i.e. the speed of the free end of a mill blade. This tip speed must not become too high, as in that case all kinds of turbulence problems occur which adversely affect the energy yield of the mill. Mills with long blades therefore have a low rotational speed so as to limit the tip speed and consequently cannot generate a very great deal of energy, while mills with short blades can have a higher rotational speed but owing to the limited blade length cannot generate a great deal of energy either, because they intercept only little wind. Moreover, the mill blades are generally disposed fairly close to the surface of the earth, where there is rather little wind, at any rate compared to the higher strata of the air. These problems and the fact that the mills require & minimum mutual distance lead to a situation where only at highly favorable sites, such as for instance a sea dike, a reasonable energy yield in the order of at most one megawatt per linear kilometer can be obtained.

From the prior art, further a different type of apparatus for extracting energy from the wind is known. This apparatus is described in British patent application GB-A-2 119 451. This known apparatus comprises a number of slats which can be designed as wings, which slats have their outer ends fixedly connected to two endless pulling cables. These pulling cables are both stretched over two return wheels which are bearing-mounted in a frame. This whole assembly of frame, return wheels, endless pulling cables and slats is to be pulled up by wind-force and to be maintained in the air. Moreover, with a complex system of pulling cables, the rotation energy of the return wheels is to be transmitted to a generator disposed on the ground. Apart from the fact that the wind conditions are only very rarely sufficient to keep this entire installation with frames, return wheels, pulling cables and slats in the air, the slats are moreover rigidly connected to the pulling cables Adjusting the position of the slats to the wind is therefore not possible. Moreover, the slats have the same position in the descending path as in the ascending path. As a result, the efficiency of the known apparatus will be particularly low and the known apparatus is useful only under very strong wind conditions.

GE-A-2 206 652 discloses an apparatus wherein a number of aerofoil profiles are connected at the ends thereof to two pulling cables. These pulling cables are each passed over two return wheels mounted in a frame that is disposed on the ground. The aerofoils are fixedly connected to the pulling cables, which are constructed as chains. As a result of the fact that the entire construction in this known apparatus is supported by a frame, the altitude to which the known apparatus can extend and also the width of the known apparatus are very limited. As a consequence, only a low power output can be generated with the known apparatus.

The object of the invention is to provide an apparatus without the above-mentioned disadvantages, by means of which major powers can be generated.

According to the invention, the driving apparatus for driving a drive shaft comprises a number of kites and at least one pulling cable, the apparatus comprising means for varying the position of the kites, while the kites are arranged to follow an ascending path and a descending path, the kites, at least in the ascending path, being connected to the at least one pulling cable, which pulling cable engages a driving element which is directly or indirectly connected to the drive shaft, and the means for varying the position of the kites are arranged to impose a first position on the kites in the ascending path in which position the kites, under the influence of the wind, are subject to an upward force, and the means for varying the position of the kites are further arranged to impose a second position on the kites in the descending path in which position the kites, under the influence of the wind, are subject to a lesser upward force than in the ascending path or even to a downward force.

Such a driving apparatus does not buffer from the problems as described hereinabove in respect of a mill with blades. The fact is that each part of the kite has the same speed with respect to the wind. This has as a consequence that the kites can be made of very broad design so that a large wind-intercepting area is obtained. Moreover, there is hardly any limitation on the length of the pulling cable and hence on the height of the total driving apparatus. Accordingly, with the driving apparatus according to the invention it is easy to make use of the much higher wind velocities occurring in the higher strata of the air. The kites pull up the cable themselves and the entire construction can be made to be self-supporting. Preliminary calculations have shown that with a driving apparatus including a hundred kites with a kite surface area of 5 m$^2$ at wind-force 8 a power output of about 1 megawatt can be obtained. According to the preliminary calculations, when the apparatus is provided with, for instance, 500 kites each with a surface area of 100 m$^2$, at wind-force 5 a power output of about 11 megawatts is obtained. Such dimensions fall within the possibilities, since with modern materials fairly light cables can be manufactured which can still resist very high tensile forces. Accordingly, the amount of energy yield per linear kilometer can take a very high value, because energy can be extracted from the wind not only close to the surface of the earth but also at high altitudes. It will be clear that the driving apparatus according to the invention offers fantastic perspectives.

In particular as a result of the fact that the position of the kites can be varied owing to the means present to that effect, the path followed by the kites can be entirely controlled without necessitating to that effect a frame for guiding the or each pulling cable. So, the or each pulling cable is maintained in the air by the kites themselves, which is possible only when the path followed by the kites can be controlled. Precisely by varying the position of the kites and by the presence of the means serving to that effect, a fully self-supporting apparatus can be provided. As a result of the absence of a frame in which return wheels are bearing-mounted, the apparatus can have particularly large dimensions and so generate large power outputs. Accordingly, the invention is based on the insight that the apparatus can be made of frameless and self-supporting construction in that the position of the kites is controllable.

Many variations of the above-described basic concept are possible, which are described in the subclaims and will be clarified in detail hereinafter on the basis of a number of exemplary embodiments, with reference to the drawing.

Figure 6:
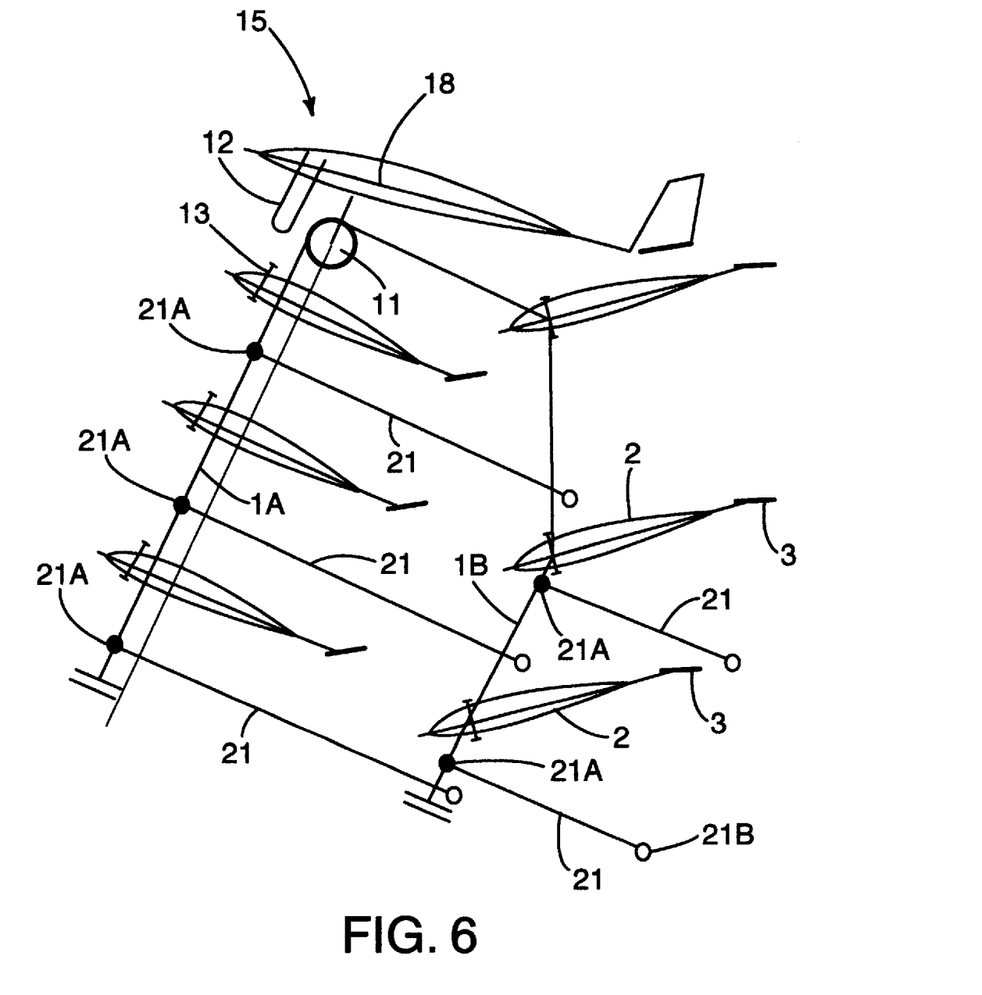
FIG. 6 shows a fourth exemplary embodiment of the driving apparatus according to the invention.
Figure 8:
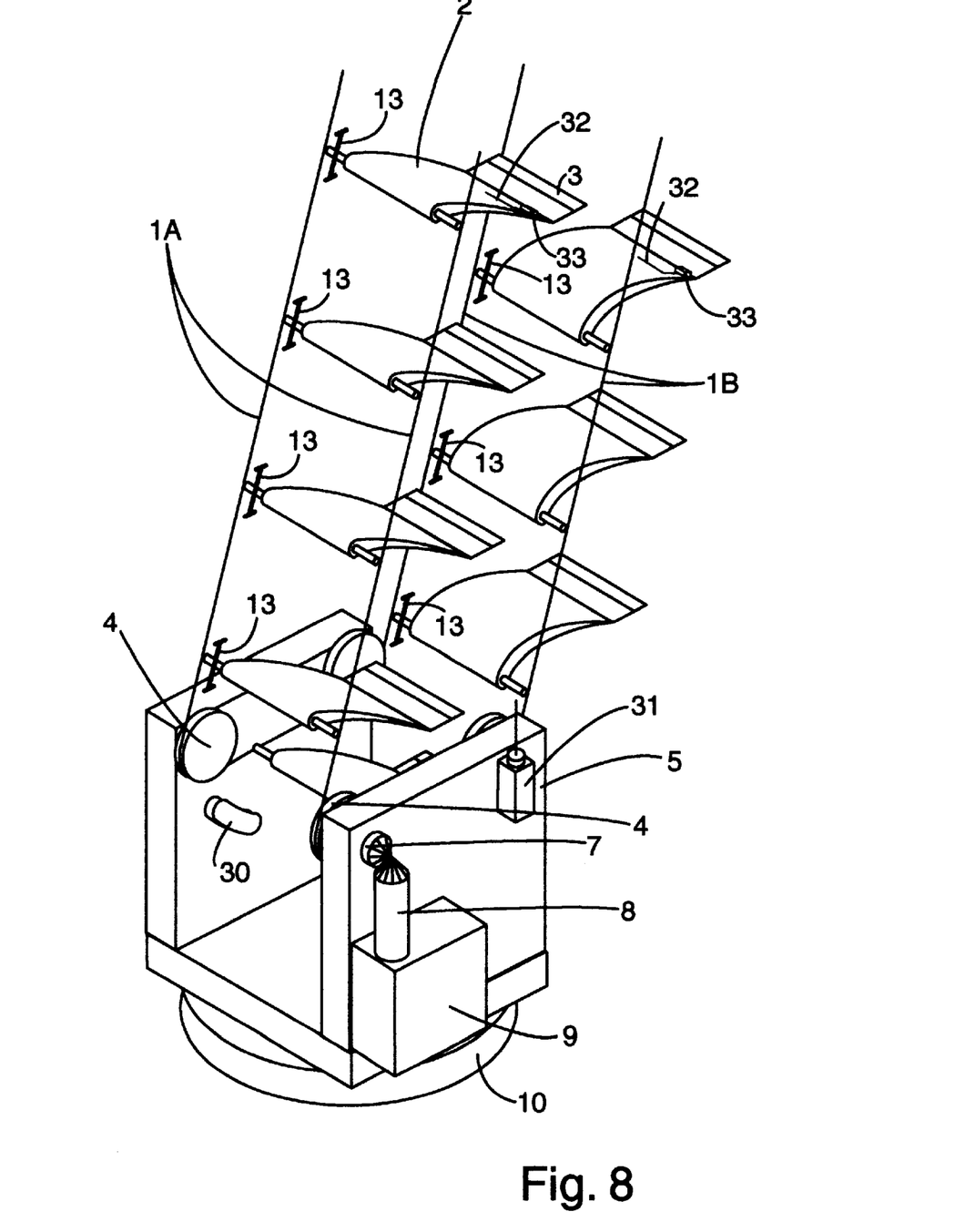
FIG. 8 shows a perspective view of a fifth exemplary embodiment according to the invention.

The apparatus will first be described with reference to the exemplary embodiment of FIG. 8. The driving apparatus comprises a number of kites 2 and, in the present cast two, pulling cables 1 extending in spaced relation and substantially parallel to each other. The kites 2 extend between the pulling cables 1. In FIG. 8 only the lower part of the apparatus is shown. It will be clear that the apparatus in fact extends considerably further upwards. In the present exemplary embodiment, the pulling cables 1 are of endless design and are passed adjacent the upper end of the driving apparatus over a return element 11, for instance such as is represented in FIG. 6. The two pulling cables 1 each pass at the lower end of the driving apparatus over a driving element 4, which in the present case is connected directly to a drive shaft 7. The pulling cables 1 follow an ascending path 1a and a descending path 1b. The driving elements 4 are connected to a frame 5 which in turn is rotatably connected to the earth via a disc 10. Thus the total apparatus can rotate along with the wind. Optionally, the rotational position of the total apparatus can be controlled using an electronic wind vane. The kites are provided with means for varying the angle of attack thereof. Sensors can measure the necessary controlling data for controlling the angle of attack. Values to be measured are, for instance, the direction of gravity, wind velocity and wind direction, cable tension and cable position, and kite rotation. This angle of attack α determines the extent of upward force which the kite 2 is subject to as a result of the wind. In the ascending path 1a the angle of attack α of the kites 2 is selected such that the kites 2 are subject to an upward force there, while in the descending path the angle of attack α is selected such that the kites 2 are subject to a lesser upward force or even a downward force there.

Figure 7:
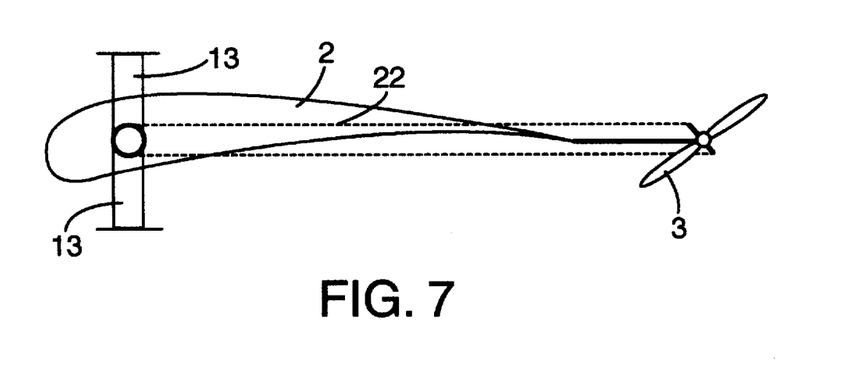
FIG. 7 shows a detail of the apparatus represented in FIG. 6.

In the exemplary embodiment represented in FIG. 8 the kites 2 have a wing profile, which yields a considerably better generation of upward force and hence results in a better efficiency of the driving apparatus. In the driving apparatus shown in FIG. 8 the means for varying the angle of attack α of each kite comprise a tail rudder kite 3. Each kite 2 is provided at the downstream end thereof with such a tail rudder kite 3. The angle of attack of the tail rudder kite 3 is adjustable with respect to that of the kite 2. As shown in FIGS. 6 and 7, the adjustment of the tail rudder kite 3 with respect to the kite 2 can be effected mechanically in that a first stop 30 is provided adjacent the lower end 16 of the pulling cable 1 and a second stop 12 is provided adjacent the upper end of the pulling cable 1. Via a cable, rod or like element 22, the tail rudder kite 3 is linked to a third stop 13, which is arranged to assume, after passing the first stop, a first position in which the tail rudder kite 3 is oriented with respect to the kite 2 in such a manner that the kite 2 is subject to the upward force mentioned, while the third stop 13 is further arranged to assume, after passing the second stop 12, a second position, in which the tail rudder kite 3 is oriented with respect to the kite 2 in such a manner that the kite 2 is subject to the above-mentioned lesser upward force or even a downward force. It goes without saying there are other possibilities for adjusting the angle of attack of the tail rudder kite 3 with respect to the kite 2. For instance, each kite 2 can be provided with a signal receiver 32 and a motor 33 by means of which the angle of attack of the tail rudder kite 3 with respect to the kite 2 is adjustable. In that case, a transmitter 31 is disposed on the ground, which is arranged to transmit to each kite 2 a signal for driving the motor for the purpose of providing the appropriate angle of attack of the tail rudder kite 3 with respect to the kite 2.

Figure 4:
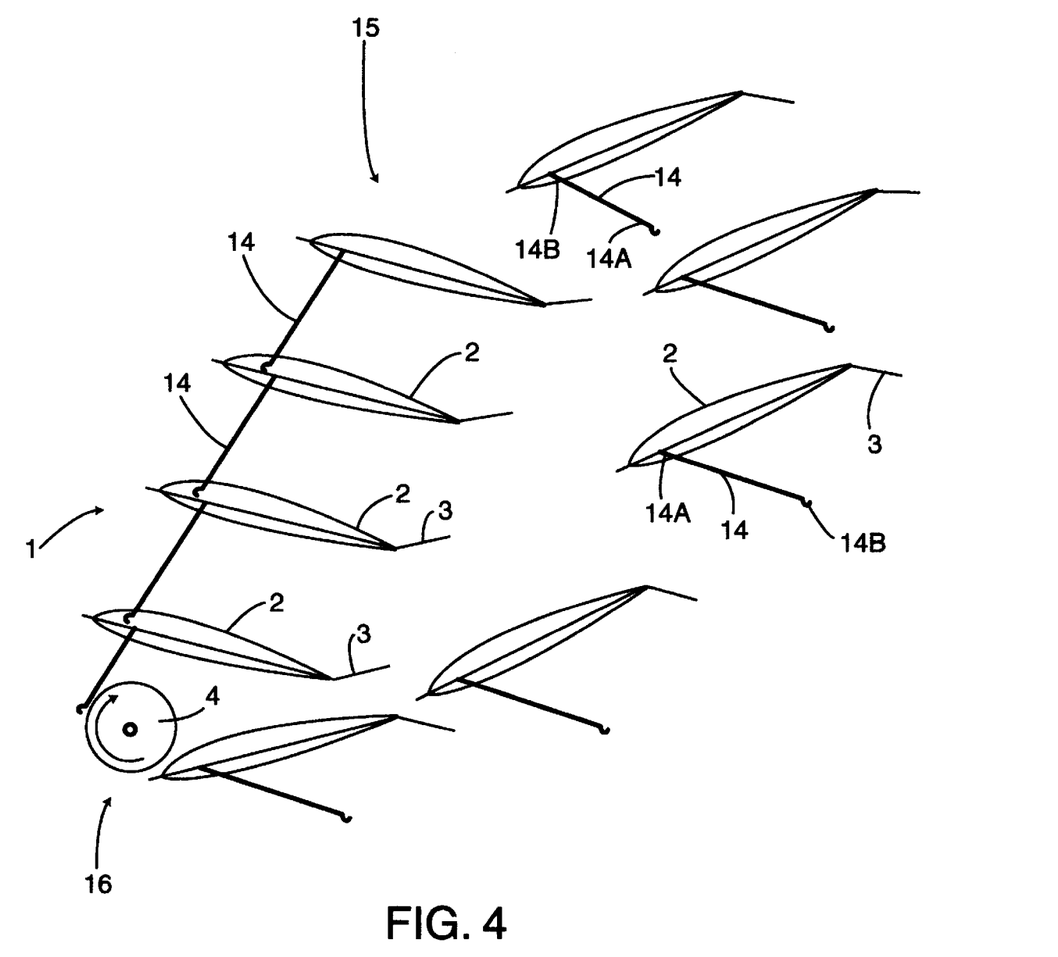
FIG. 4 shows a second exemplary embodiment of the driving apparatus.

With such a control of the tail rudder kite 3 it is even possible, at least when the kite 2 has a wing profile, to have the kite 2 follow a certain path entirely freely, that is, detached from any cable. Such an embodiment is show in FIG. 4. In the driving apparatus shown in FIG. 4, each kite 2 is provided with at least one cable length 14 which by a first end 14a is fixedly connected to the kite 2 in question. A second end 14b of the cable length 14 is capable of being coupled to and uncoupled from a lower kite 2. Uncoupling occurs, for instance under electronic control, at the upper end 15 of the pulling cable 1 composed of cable lengths 14. Coupling occurs at the lower end 16 of the pulling cable 1 composed of cable lengths 14. The driving element 4 is arranged between the lower end 16 and the upper end 15 of the at least one pulling cable 1. Optionally, adjacent the lower end 16 of the apparatus a kind of fyke (not shown) can be provided, which the kites 2 can fly into. In this tyke the coupling between the cable end 14b and the incoming kite 2 is to be effected. It is also conceivable that kites, in the manner of a glider, fly to another point at some distance, so that a combination of transportation and energy production is achieved.

Figure 5:
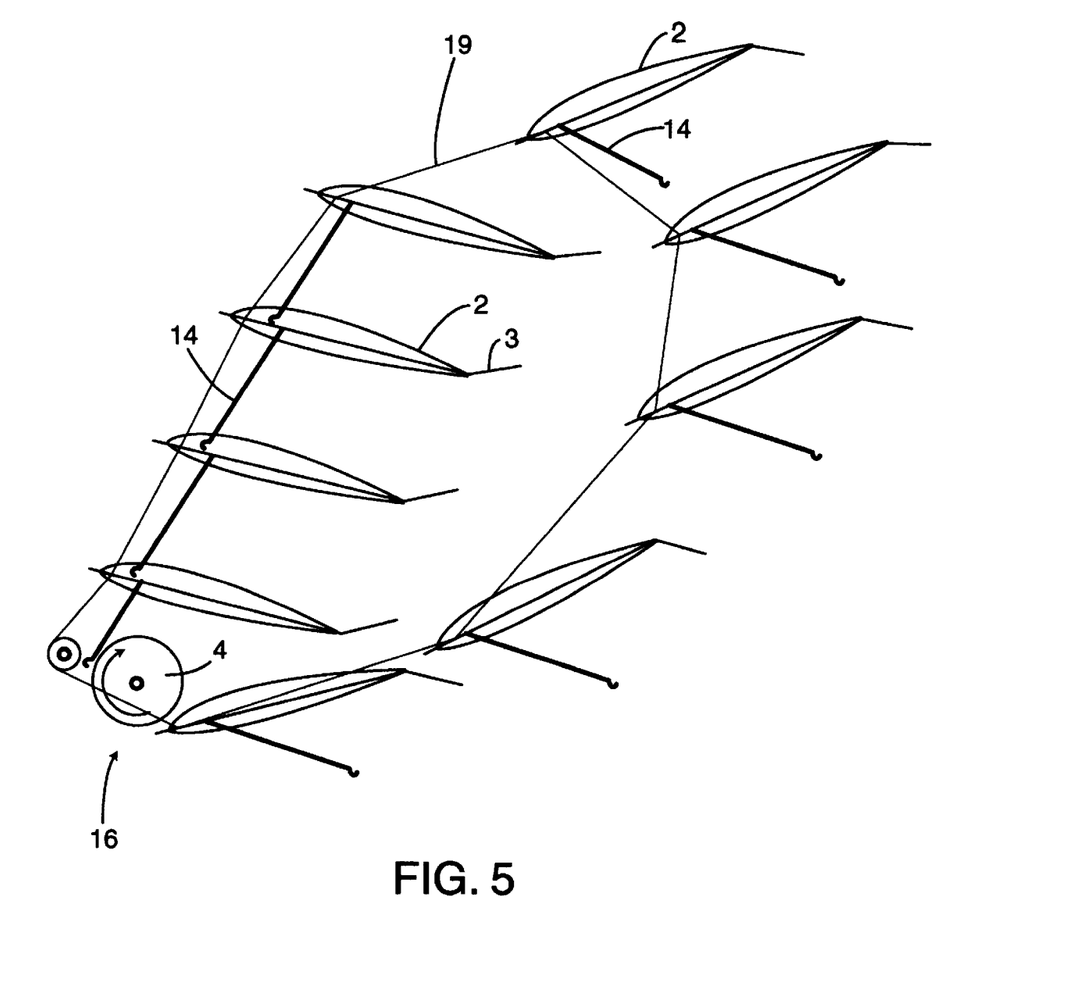
FIG. 5 shows a third exemplary embodiment of the driving apparatus.

In order to somewhat facilitate the guidance of the kites to the lower end of the apparatus, it is possible, as is shown in FIG. 5, to provide a connecting line 19 which is closed in itself and which leads the kites 2 whose cable length 14 is uncoupled to the lower end 16 where the incoming kite 2 can be coupled to the second end 14b of the cable length 14 of the preceding kite 2.

Figure 3:
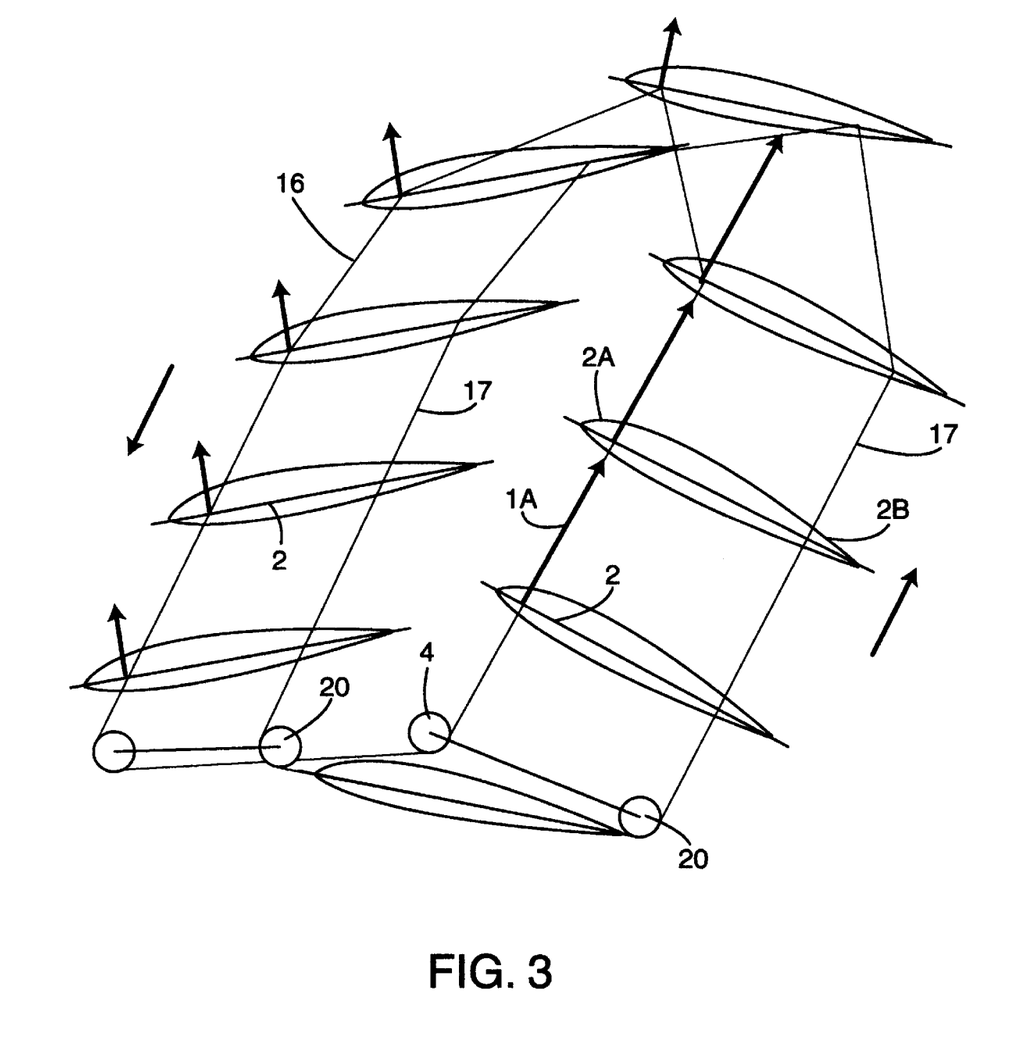
FIG. 3 shows a first exemplary embodiment of the driving apparatus.

According to an alternative embodiment of the driving apparatus, which is represented in FIG. 3, the means for varying the angle of attack of the kites 2 comprise a control cable 17 which moves along with the kites 2 and is tensioned in such a manner that the kites 2 both in the ascending 1a and in the descending path 1b assume the desired angle of attack α. To that end, the control cable passes over guide rollers 20 which can optionally be controllably driven in order to provide the appropriate position of the control cable 17 and the appropriate tension on the control cable 17. The kites 2 are connected at an upstream end 2a to the pulling cable 1 and at a downstream end 2b to the control cable 17.

As has already been indicated hereinbefore, the upper end 15 of the ascending path 1a can be limited by a return element 11. It goes without saying that this return element 11 cannot by itself remain suspended in the air and to that end a lift element 18 must be present. In the exemplary embodiment shown in FIG. 6 this lift element consists of a kite 18. It is also possible, however, that the lift element 18 is formed by a gas or air balloon 35 or a mast 34 or like construction. The mast does not have to be of particularly heavy design, as the kites 2 and the associated pulling cable 1 are basically self-supporting. In order to arrange for the weight of the kites 2 and the pulling cable 1b in the descending path not to hang from the return element 11, such an angle of attack can be imposed on the kites 2 in the descending path 1b that still a slight upward force is being exerted on them by the wind. It is also possible, however, to arrange slidable connecting cables 21 between the ascending path 1a and the descending path 1b. Thus the descending path 1b with the kites 2 present therein can be basically suspended from the ascending path 1a. The connecting cables 21 can by their one end 21a, for instance, be fixedly connected to the pulling cable 1 and by the other end 21b hook slidably onto the descending part 1b of the pulling cable 1.

Figure 9:
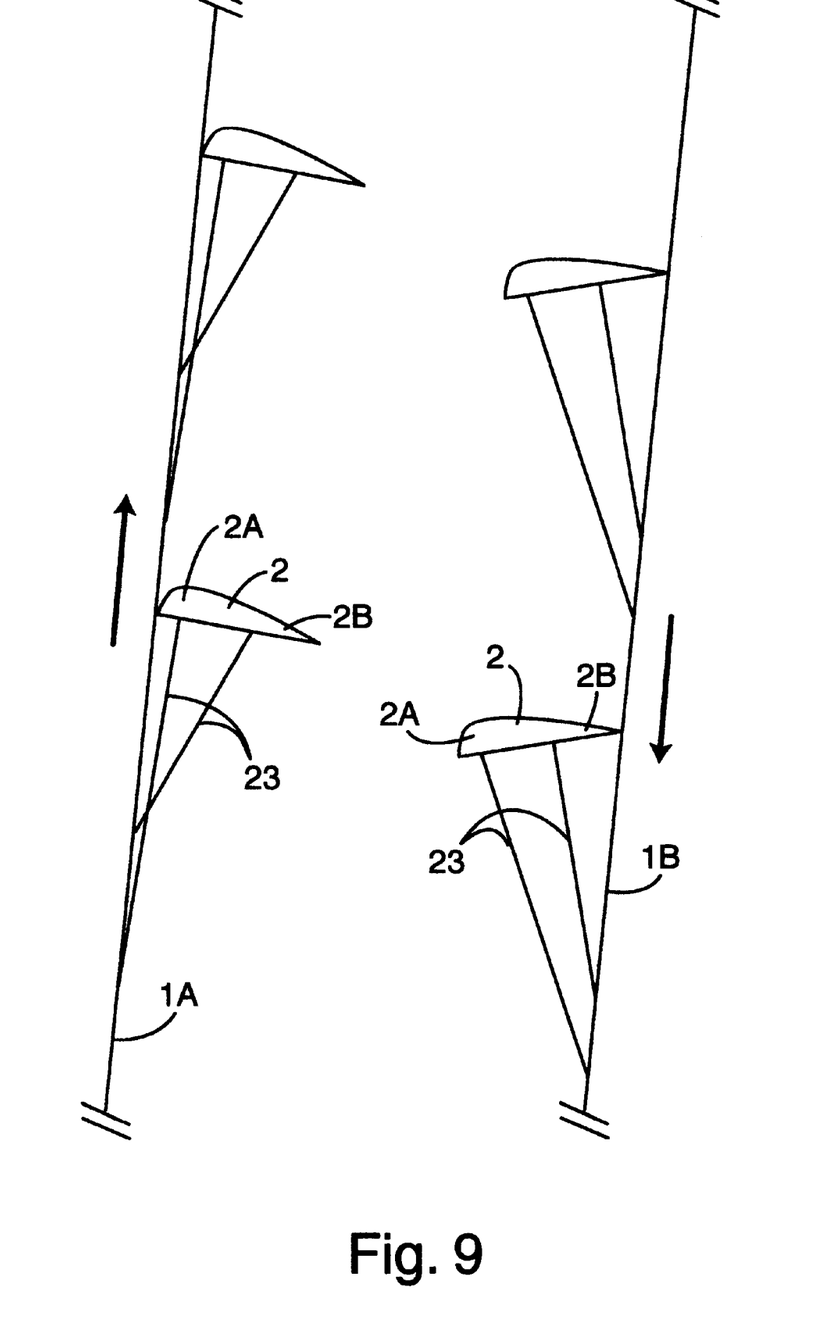
FIG. 9 shows an alternative way of regulating the angle of attack of the kites.

FIG. 9 schematically shows yet another possibility for providing different angles of attack to the kites 2. In the ascending path 1a the kites 2 have their noses 2a disposed against the pulling cable 1a, so that they tilt backward and sustain much lift as a result of the wind. In the descending path 1b the kites 2 have their downstream end 2b disposed against the pulling cable 1, so that they assume an angle of attack in which the kites 2 sustain a lesser upward force or even a downward force under the influence of the wind. In order to make this possible, each kite, when passing the upper end or the lower end of the apparatus, is to be moved between the preferably double-design pulling cable 1.

Moreover, the guy ropes 23 by means of which the kites are connected to the pulling cable 1 allow of manipulation so as to influence the angle of attack of the kites. Thus, for instance, the point of attachment of the guy ropes 23 on the pulling cable 1 could be shifted.

Figure 10:
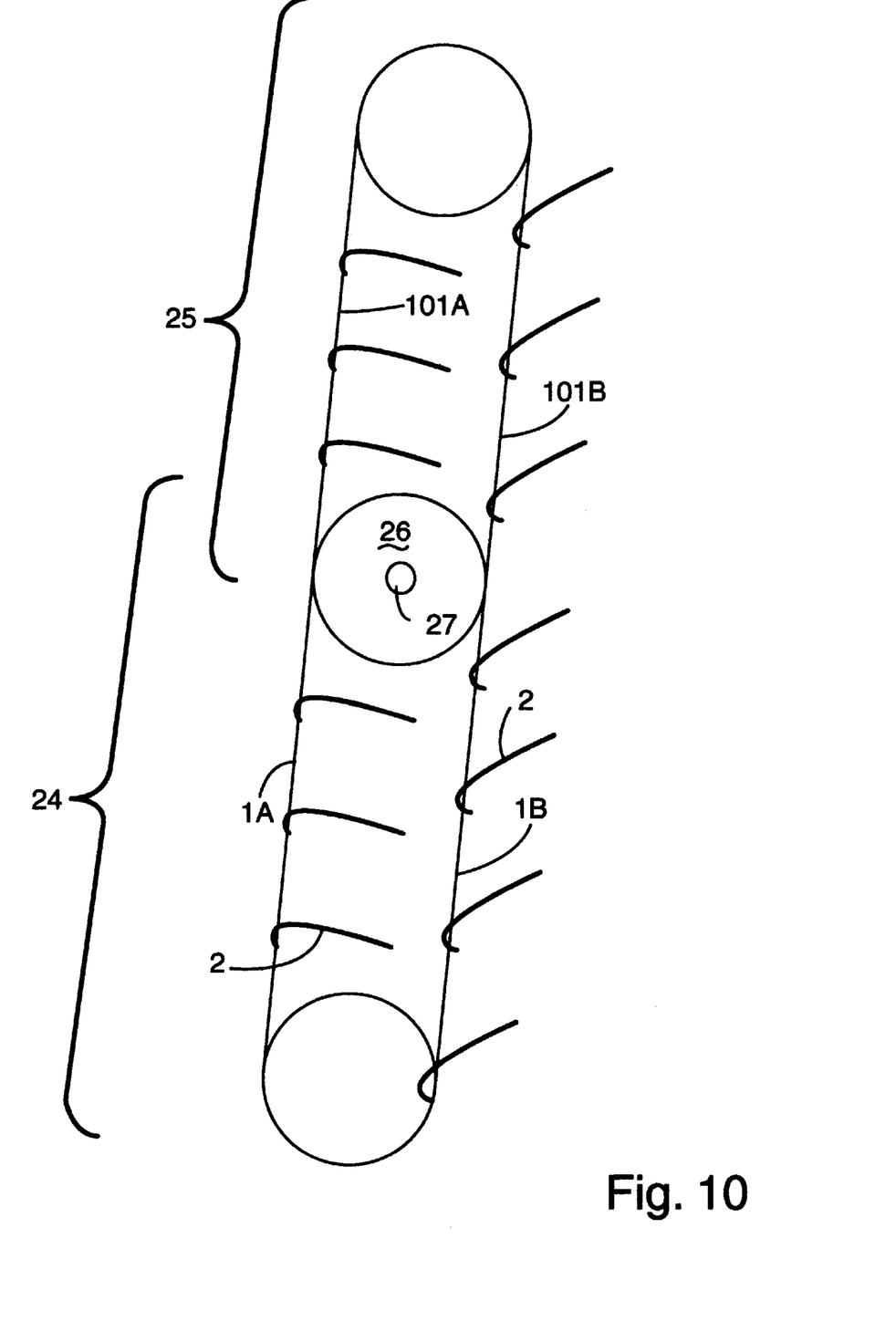
FIG. 10 schematically shows an exemplary embodiment consisting of a number of sections.

FIG. 10 schematically shows an exemplary embodiment of a driving apparatus consisting of two sections 24, 25. The sections are connected to each other via return wheels 26 which are mounted on a common shaft 27. Obviously, more than two sections can be used. Such a driving apparatus divided into sections provides the advantage that only the pulling cable 1 of the lower section 24 must have the maximum thickness. The pulling cables 101a, 101b of the higher sections can be made of successively thinner design.

Figure 11:
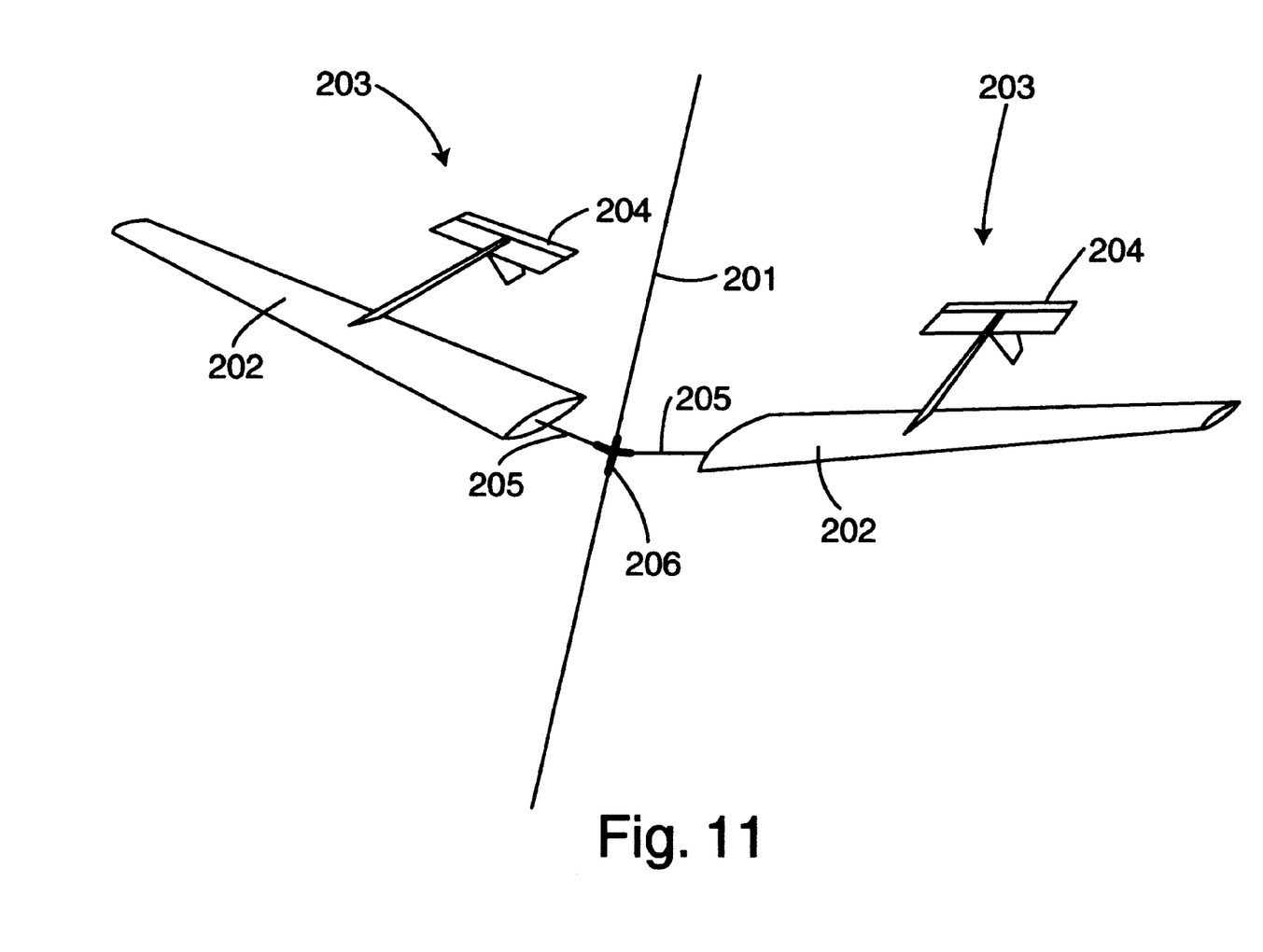
FIG. 11 shows a portion of an embodiment with a single pulling cable.

FIG. 11 shows an exemplary embodiment of a driving apparatus according to the invention that is provided with a single pulling cable 201, with the kites 202 extending in pairs on opposite sides of the pulling cable 201. The kites 202 in the present exemplary embodiment are designed as wing profiles which are arranged in pairs somewhat in a V-shape. As a consequence of this V-shape, the pair of kites 202 is stable. Further, the wings 202 are provided with a tail 203 which is provided with a tail rudder kite 204 whose angle of attack is adjustable, for instance in the manner as described in claim 10 or 11. Via spar 205 the wings are pivotally mounted in a clamp 206 which engages the cable 201. As a result of the presence of the pivotal bearing of the spar 205 in the clamp 206, the angle of attack of the wing 202 can be varied under the influence of the angle of attack of the tail rudder kite 204, in such a manner that the wing follows the desired path.

Figures 12, 13:
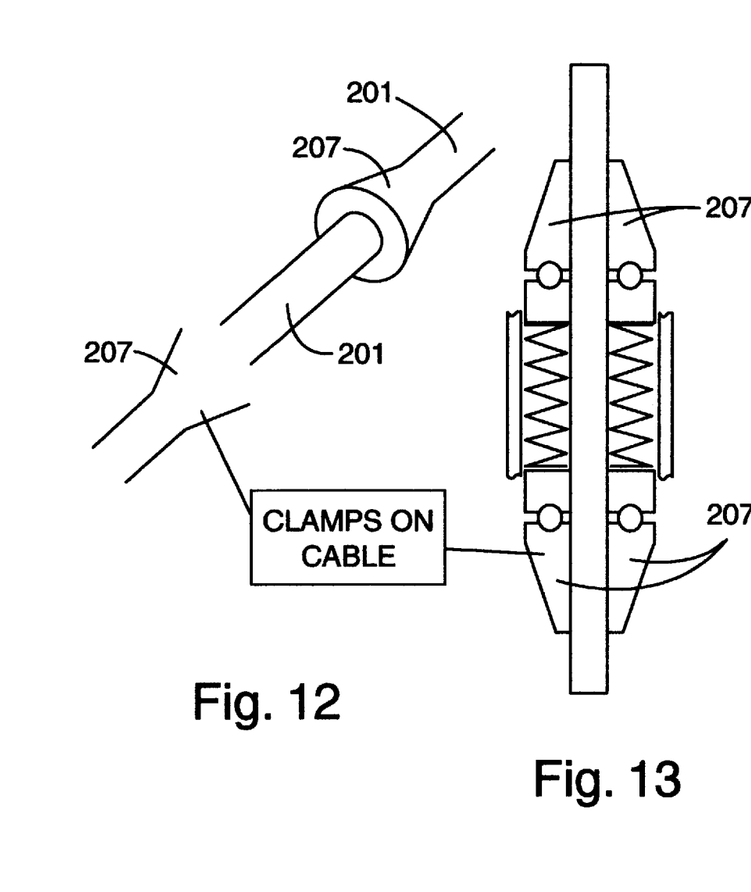
FIG. 12 shows a cable with two stops.
FIG. 13 shows a cross section of a pair of kites clamped onto the cable.
Figure 14:
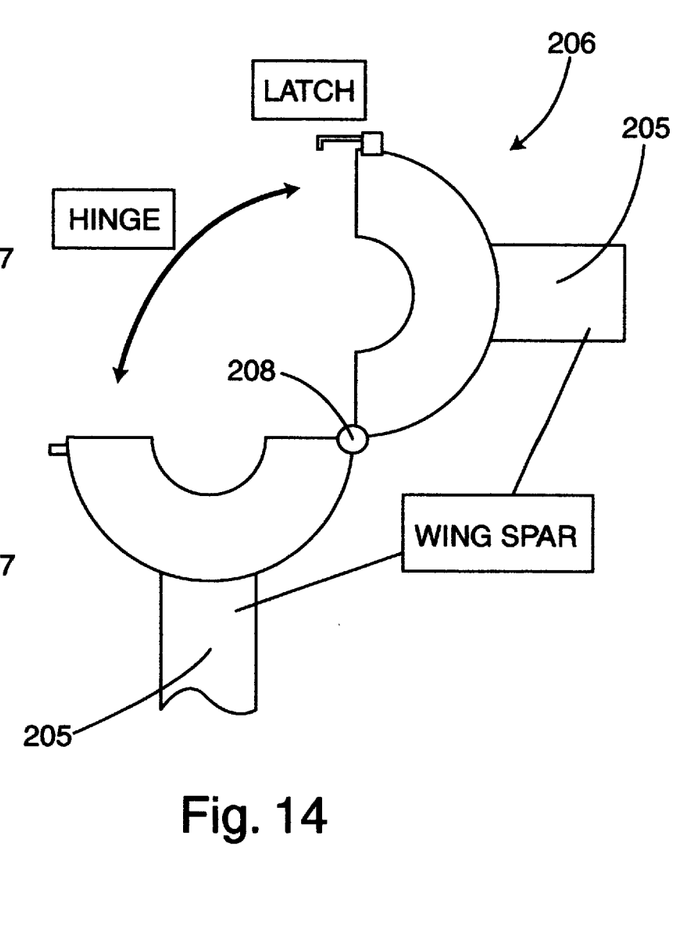
FIG. 14 shows an opened clamp of a pair of kites of the exemplary embodiment represented in FIG. 11.

A possible variant of the embodiments described above is that the kites or wings can be uncoupled from the cable and can be coupled to it again. This provides the advantage that the number of kites per linear meter of cable can be varied. When there is a very strong wind, the distance between the kites can be large, whereas if the wind is weak, this distance can be selected to be smaller. This has as a consequence that the tensile force that is exerted on the cable can be kept approximately constant at different windforces. This is of particularly great importance, since specifically the tensile force the cable can resist constitutes the limitation on the power that can be generated. Because the kites can be uncoupled and the number of kites mounted on the cable can be varied, the apparatus can function at widely diverging wind-forces, so that power is always available. It goes without saying that there are many possibilities of realizing the coupling of the kites to the pulling cable and their uncoupling. In ski-lifts, use is made of a system based on a shear engagement between the upper end of the rod on which a seat dish is mounted and the cable. FIGS. 12–14 show an alternative embodiment, in which limiting clamps 207 are fixedly mounted on the cable 201, between which clamps 207 a clamp 206, which can be opened and closed by means of a hinge 208, can be received. The clamp 206 is connected to the spars 205 to which the wings 202 are secured. Although in relation to FIGS. 12–14 reference is made to the exemplary embodiment of FIG. 11, it will be clear that the principle of coupling and uncoupling kites to and from the pulling cable is also an option in relation to the other exemplary embodiments.

Figure 15:
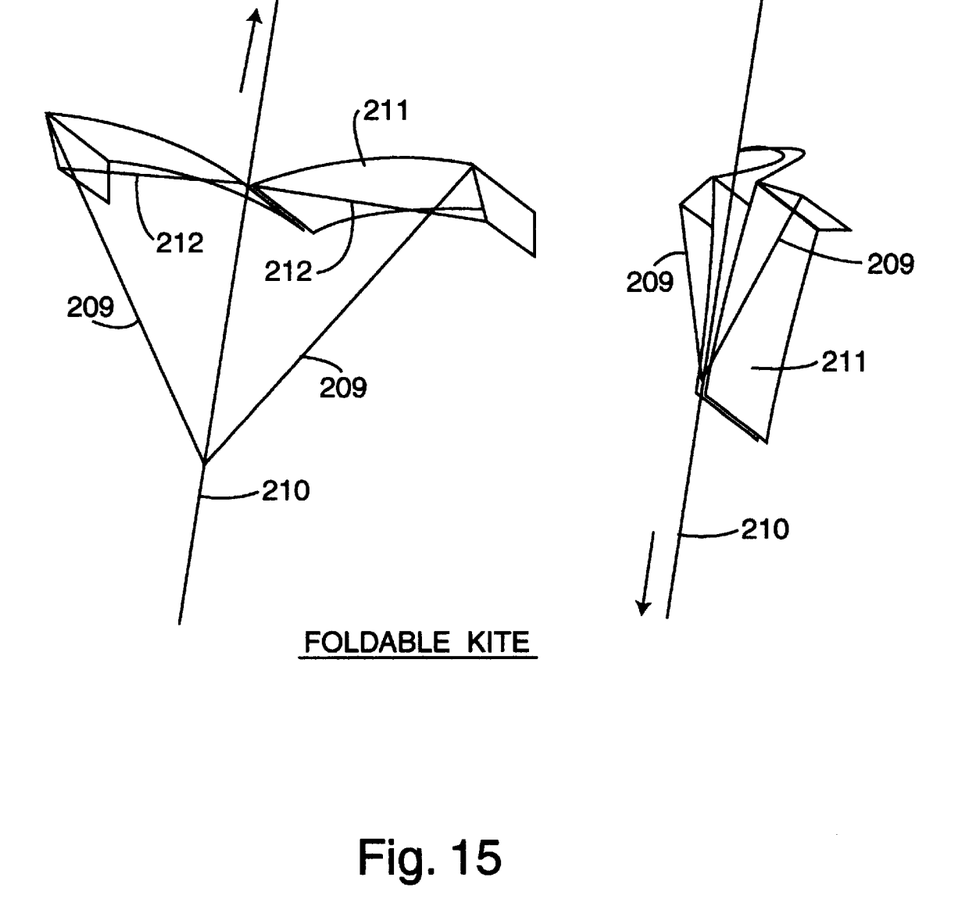
FIG. 15 shows an exemplary embodiment of a foldable kite.
Figures 16, 17:
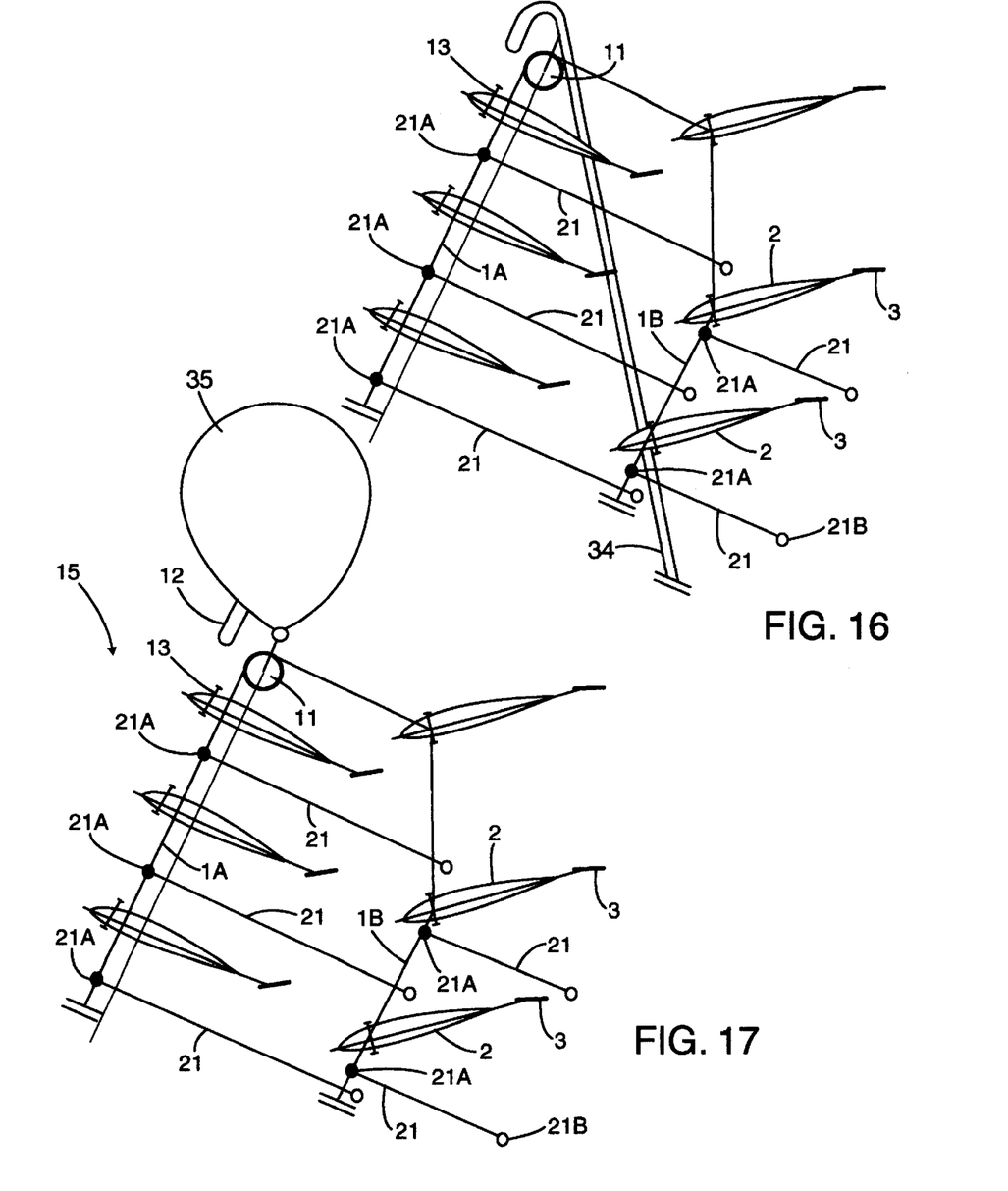
FIG. 16 shows an exemplary embodiment of the invention including a mast.
FIG. 17 shows an exemplary embodiment of the invention including a balloon.

In the exemplary embodiments discussed hereinabove the angle of incidence of the kite with respect to the wind direction was varied. By varying this angle of attack, the upward force the kite is subject to is varied It is also possible, however, to vary the upward force of the kite by folding it. Such a foldable kite i shown in FIG. 15 in a folded and an unfolded position. It holds for this exemplary embodiment too that means are present for varying the position of the kite. In the present case, these means are formed by the cords 209 connected at one end to the pulling cable 210 and at the other to the kite 211. By shifting the point of engagement of the end of the cords 209 on the pulling cable 210, the position of the kite can be modified. In the present exemplary embodiment, the middle of the kite 211 is fixedly connected to the pulling cable 210. Further, cords 212 are provided, which prevent the kite from being unfolded further than is intended. With this embodiment too, the upward force sustained by the kites is varied by unfolding the kite to a greater or lesser extent. As a consequence, also the path traveled by the kite can be controlled, so that the construction can be made of frameless design.

Figure 1:
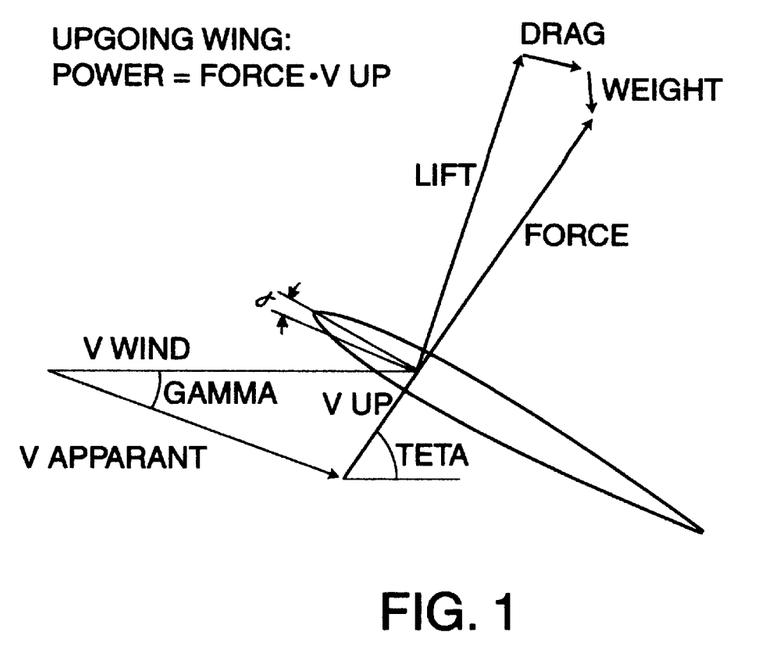
FIG. 1 shows a wing profile oriented at a first angle of attack, and indicates the forces involved.
Figure 2:
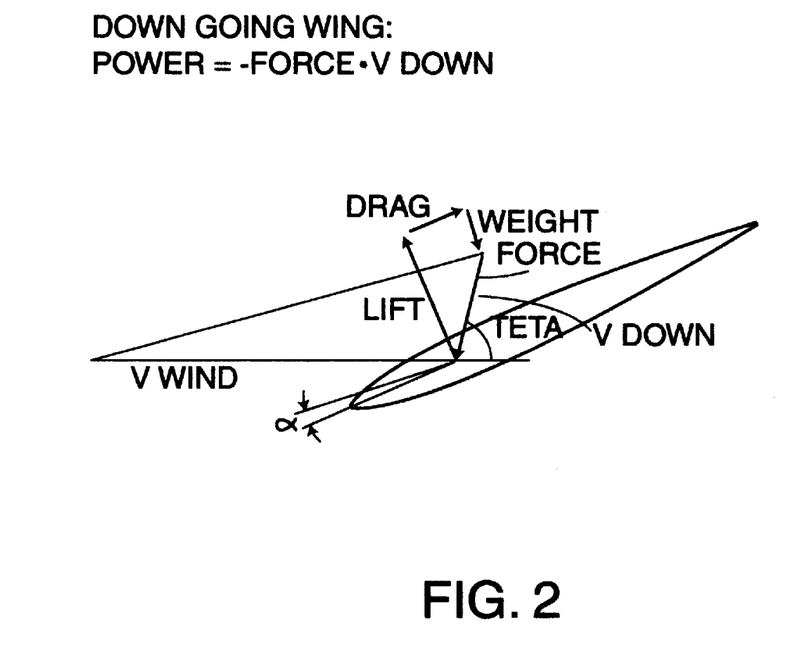
FIG. 2 shows a wing profile oriented at a second angle of attack, and indicates the forces involved.

In order to clarify the influence of the angle of attack on the upward force, reference is made to FIGS. 1 and 2. In FIG. 1 the angle of attack α of the kite is selected such that much lift or upward force is obtained. The wind velocity V is indicated by the horizontal line. The upward velocity of the kite 2 is designated as V-up. Subtracting these from each other yields the apparent wind velocity V-apparent which that kite 2 is subject to. This apparent wind leads to a certain upward force which is exerted on the kite 2 and is designated as 'lift' in the figures, and moreover leads to a certain drag. Further, the kite 2 is naturally subject to gravity, which is indicated by the term 'weight'. The resultant force is designated 'force' and provides to the kite 2 its upward velocity V-up. The product of the upward velocity V-up and the resultant force ('force') yields the power that can be produced with the kite. It is clear from the differences between FIGS. 1 and 2 that the angle of attack of the kite has a dramatic influence on the lift and on the power the kite produces.

It will be clear that the exemplary embodiments shown are only intended as examples and that various modifications are possible within the framework of the invention.

I claim:

1. Wind operable driving apparatus comprising:
   a plurality of kites arranged to follow an ascending path and a descending path;
   a drive element for driving a drive shaft;
   a pulling cable connected to each of said kites and engaging said drive element;
   each of said kites comprising an adjustable control element for imposing a first position on said kites when said kites follow said ascending path and for imposing a second position on said kites when said kites follow said descending path, whereby said kites are subjected to a lesser upward force in said ascending path than in said descending path.

2. The apparatus in accordance with claim 1, wherein said kites are disposed at a first relative angle of attack in said first position and disposed at a second relative angle of attack, different from said first angle of attack, in said second position.

3. The apparatus in accordance with claim 2, wherein said first position of said kites is a folded position and said second position of said kites is an unfolded position.

4. The apparatus in accordance with claim 1, and further comprising a frame and bearings in said frame and wherein said drive shaft is mounted in said bearings.

5. The apparatus in accordance with claim 1, and further comprising an endless pulling cable having opposite sides and said kites are disposed in pairs on said opposite sides of the pulling cable.

6. The apparatus in accordance with claim 5, wherein said kites of each pair of kites are arranged in a V-shape.

7. The driving apparatus in accordance with claim 1, wherein said ascending path has an upper end and an upper diverting element at said upper end and a lower end and a lower diverting element at said lower end, said apparatus further comprising first and second endless pulling cables extending along first and second substantially parallel extending paths, said kites extending between said pulling cables, each of said pulling cables being diverted at said upper end over said upper diverting element to said descending path and diverted at said lower end via said driving element to said ascending path.

8. The apparatus in accordance with claim 1, and further comprising a plurality of length of cable, each of said length uniquely associated with at least one of said kites having a first end fixedly connected to said associated kites and a second end adapted to be coupled to a lower kite, disposed below said one kite when said associated kite is disposed at said upper end of the pulling cable and adapted to be coupled to said other kite at said lower end of said pulling cable, said driving element being disposed between said lower end and said upper end.

9. The driving apparatus in accordance with claim 1, and wherein each of said kites has a downstream and each of said plurality of control elements is connected to an associated one of said kites and each of said rudder kites has an angle of attack and said angle of attack is adjustable with respect to said associated kite.

10. The driving apparatus in accordance with claim 9, and wherein said pulling cable has an upper end and a lower end and a first stop adjacent to said lower end and a second stop adjacent said upper end and a third stop, said tail rudder kite being linked to said third stop via a control element, said third stop arranged to assume a first position wherein said tail rudder kite is oriented with respect to said associated kite such that said associated kite is subjected to said upward force, said third stop further arranged to assume a second position of said third stop wherein said tail rudder kite is oriented with respect to said associated kite such that the associated kite is subject to a reduced upward force, reduced from said first upward force.

11. The driving apparatus in accordance with claim 9, wherein said associated kite is provided with a signal receiver and a motor operative to adjust said angle of said tail rudder kite, said driving apparatus further comprising a transmitter for transmitting a signal for controlling said motor to adjust said tail rudder kite.

12. The driving apparatus in accordance with claim 1, wherein said control element comprises a movable control cable, moving along with said plurality of kites and wherein said cable is tensioned to control said angle of attack of said kites to a desired angle.

13. The driving apparatus in accordance with claim 1, and further comprising a lift element and a return element connected to a lift element and wherein said ascending path has an upper end and wherein said pulling cable is passed over said return element adjacent said upper end.

14. The driving apparatus in accordance with claim 13, wherein the lift element comprises a balloon.

15. The driving apparatus in accordance with claim 13, wherein said lift element comprises a kite.

16. The driving apparatus in accordance with claim 13, wherein said lift element comprises a mast.

17. The driving apparatus in accordance with claim 1, wherein each of said kites has a pre-defined wing profile.

18. The driving apparatus in accordance with claim 1, and further comprising a drive shaft for driving a generator for the purpose of generating electrical current.

19. The driving apparatus in accordance with claim 1, wherein the driving apparatus comprises first and second interconnected sections and return elements mounted on a common shaft and interconnecting said first and second sections.

20. The driving apparatus in accordance with claim 1, wherein said pulling cable comprises an endless cable, said cable having an upper end and a lower end and wherein said kites may be selectively coupled to said pulling cable and uncoupled from said pulling cable at said lower end.

* * * * *

UNITED STATES PATENT AND TRADEMARK OFFICE
CERTIFICATE OF CORRECTION

PATENT NO. : 6,072,245
DATED : November 11, 1997
INVENTOR(S) : Wubbo Johannes Ockels It is certified that error appears in the above-identified patent and that said Letters Patent is hereby corrected as shown below:

Column 7,
Line 13, please delete "ascending" and substitute therefore -- descending --
Line 14, please delete "descending" and substitute therefore -- ascending --

Signed and Sealed this

Tenth Day of August, 2004

JON W. DUDAS
*Acting Director of the United States Patent and Trademark Office*